No. 754,026. PATENTED MAR. 8, 1904.
A. A. STUART.
KNEADING DEVICE.
APPLICATION FILED JULY 24, 1902.
NO MODEL. 2 SHEETS—SHEET 2.
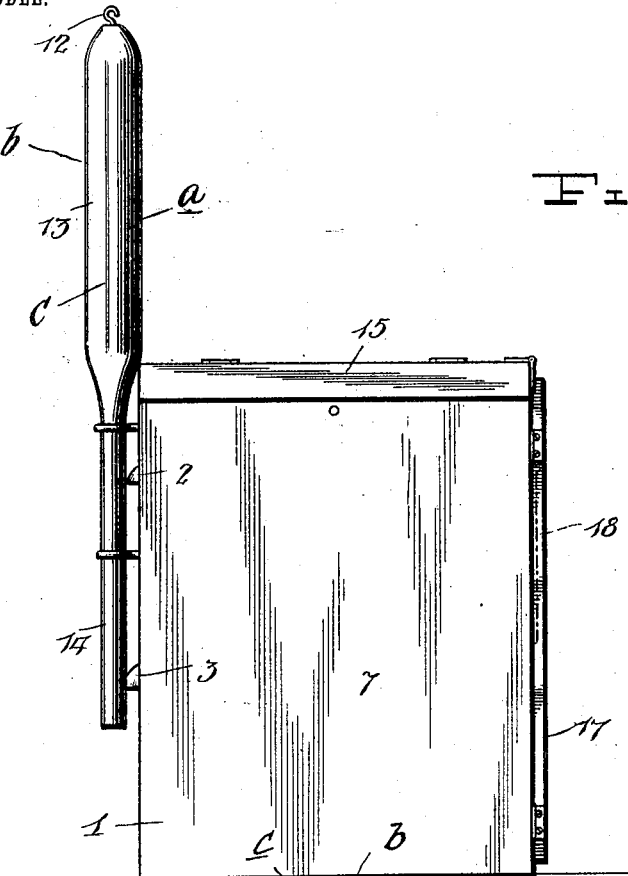
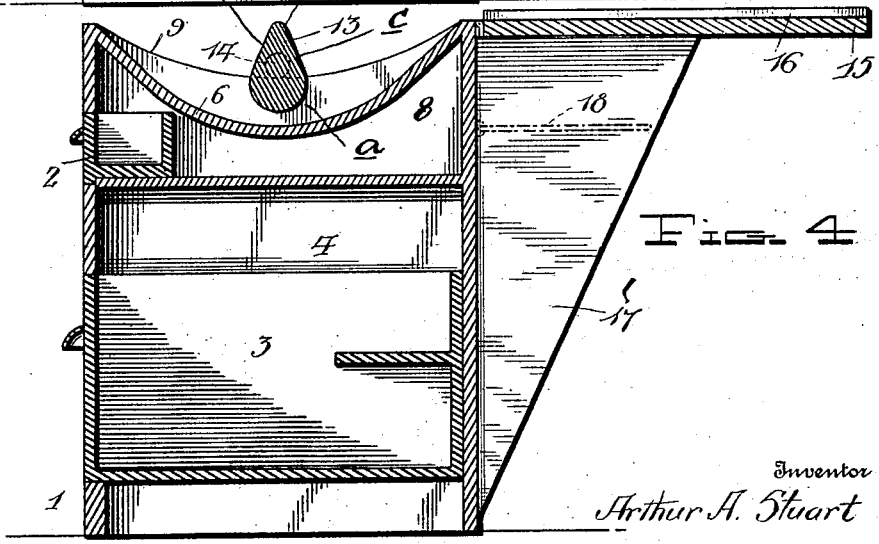
Inventor
Arthur A. Stuart No. 754,026. Patented March 8, 1904.

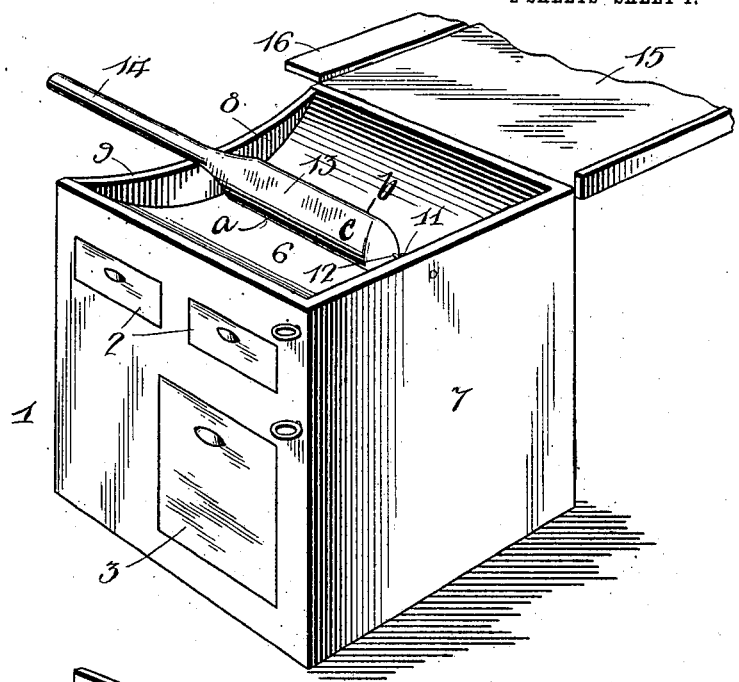
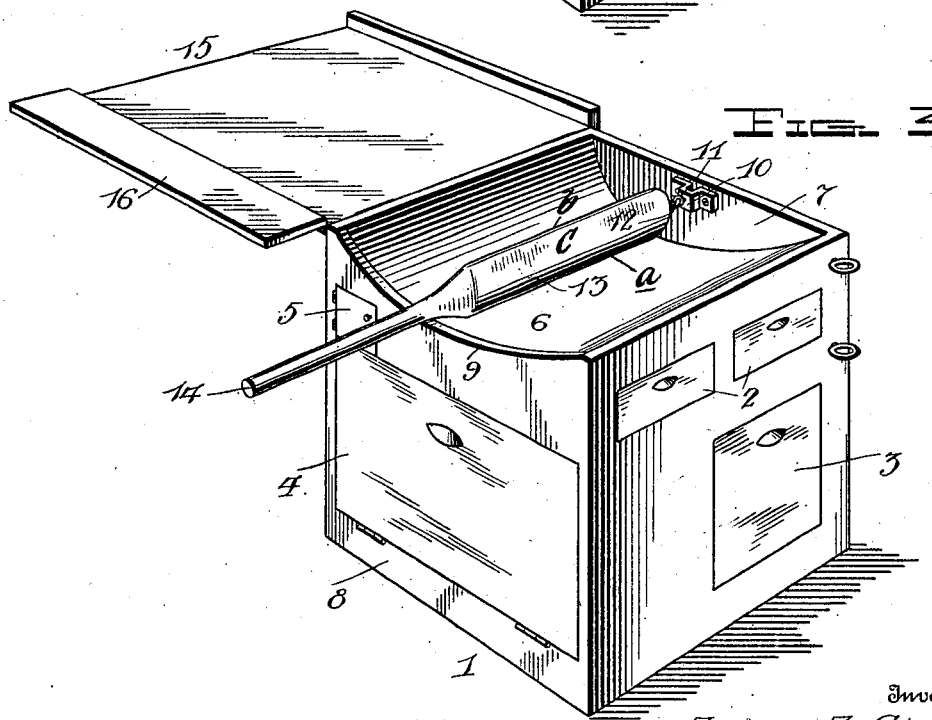

UNITED STATES PATENT OFFICE.

ARTHUR A. STUART, OF ELGIN, ILLINOIS.

KNEADING DEVICE.

SPECIFICATION forming part of Letters Patent No. 754,026, dated March 8, 1904.

Application filed July 24, 1902. Serial No. 116,822. (No model.)

*To all whom it may concern:*

Be it known that I, ARTHUR A. STUART, a citizen of the United States, residing at Elgin, in the county of Kane and State of Illinois, have invented certain new and useful Improvements in Kneading Devices; and I do declare the following to be a full, clear, and exact description of the invention, such as will enable others skilled in the art to which it appertains to make and use the same.

My invention relates to improvements in kneading devices; and it consists in the construction and combination of devices hereinafter described and claimed.

Figure 1 is a perspective view of a cabinet, showing the hinged top thereof swung backwardly and supported in a horizontal position and showing the kneading-head connected to one end of the kneading-trough in position to knead the dough placed therein. Fig. 2 is an end view with the kneading-head removed and supported in the corner-brackets of the cabinet, the cover closed, and the hinged supporting-bracket swung against the rear side of the cabinet. Fig. 3 is a perspective view taken from the rear side of the cabinet when the parts are in the position shown in Fig. 1. Fig. 4 is a longitudinal vertical sectional view through the cabinet.

In the drawings, 1 denotes the frame of the cabinet, which may be provided with one or more drawers 2 in its upper end to contain spices, soda, salt, and similar materials, and provided with a large drawer 3 near its lower end to contain bread, pies, cakes, and like articles.

4 denotes a hinged flour-bin hinged to one of the ends of the cabinet, and 5 denotes a door in said end for closing the compartment that is adapted to contain the rolling-pin.

6 denotes the kneading-trough supported in the upper end of the cabinet, and the bottom of which is approximately semicylindrical in form. 7 and 8 denote the ends of the cabinet, one of which projects upwardly a distance corresponding to the front and rear sides of the cabinet, and the other of which is formed with a gradual curve 9, the radius of which is greater than that of the concave bottom of the kneading-trough, so that said curve 9 converges at its ends to the sides of the trough. The end 8 has secured to it a bracket 10, supporting a swiveled eye 11, which is adapted to engage a hook 12, secured to the rolling-pin 13. This rolling-pin is provided with a handle 14, which is adapted to have rolling contact with the curved edge of the end piece 7, and thereby the said pin is adapted to be rotated while being moved laterally across the trough. The said rolling or kneading pin is semicylindrical in shape on one side, as at *a*, and its opposite side is angular in form, as at *b*, and provided with outwardly-converging flattened sides *c*. The diameter of the said kneading-pin and the depth of the reëntrant curved end of the trough is such that the kneading-pin is out of contact with the bottom of the kneading-trough when disposed in the center thereof and is adapted to turn freely while being operated by the rolling-handle 14, the angular side of the kneading-pin also clearing the bottom of the trough until the kneading-pin reaches the sides thereof. By this peculiar construction of the kneading-pin the semicylindrical side thereof operates to roll the dough and the angular portion thereof operates to pound the dough as the flattened sides *c* strike upon the upper side of the dough.

15 denotes the cover for the dough-trough hinged to the rear side of the cabinet and provided at one end with a hinged slat 16, which is adapted when the cover is closed out upon the cabinet to close that end of the cabinet which is formed with the curved upper end. When swung to the position shown in Fig. 1, the lid is supported by a hinged bracket 17, which is held in operative position by a hinged angle-arm 18, connected to the rear side of the cabinet. When in the position shown in Fig. 1, the cover forms a kneading shelf or board upon which the dough may be kneaded, worked, or rolled.

From the foregoing description, taken in connection with the accompanying drawings, it is thought that the construction, mode of operation, and advantages of my improved kitchen-cabinet will be readily apparent without requiring a more extended explanation.

Various changes in the form, proportion, and the minor details of construction may be resorted to without departing from the principle or sacrificing any of the advantages of this invention.

Having thus described my invention, what I claim as new, and desire to secure by Letters Patent, is—

1. In combination with a kneading-trough having downwardly-converging sides, a kneading-pin adapted to be rolled from side to side of the trough, and a guide and support for the kneading-pin, said guide and support converging outwardly and upwardly toward the sides of the trough and the diameter of the kneading-pin being such that when at the center of the trough it is out of contact with the bottom thereof, substantially as described.

2. In combination with a kneading-trough having downwardly-converging sides, a kneading-pin adapted to be rolled from side to side of the trough, and a guide and support for the kneading-pin, said guide and support converging outwardly and upwardly toward the sides of the trough, and the kneading-pin being semicylindrical on one side and provided with outwardly-converging sides and of such diameter as to be out of contact with the bottom of the trough when at the center thereof, substantially as described.

In testimony whereof I have hereunto set my hand in presence of two subscribing witnesses.

ARTHUR A. STUART.

Witnesses:
    ED. N. DANGERFIELD,
    GEORGE H. REHM.